(12) United States Patent
Pantelides et al.

(10) Patent No.: US 7,856,778 B2
(45) Date of Patent: Dec. 28, 2010

(54) FRP COMPOSITE WALL PANELS AND METHODS OF MANUFACTURE

(75) Inventors: Chris P. Pantelides, Salt Lake City, UT (US); Lawrence D. Reaveley, Salt Lake City, UT (US)

(73) Assignee: University of Utah Foundation, Salt Lake City, UT (US)

( * ) Notice: Subject to any disclaimer, the term of this patent is extended or adjusted under 35 U.S.C. 154(b) by 920 days.

(21) Appl. No.: 11/442,656

(22) Filed: May 25, 2006

(65) Prior Publication Data

US 2006/0284328 A1 Dec. 21, 2006

Related U.S. Application Data

(60) Provisional application No. 60/684,642, filed on May 25, 2005.

(51) Int. Cl.
*E04C 1/42* (2006.01)

(52) U.S. Cl. ............... 52/309.1; 52/309.16; 52/309.17; 52/223.6; 52/414

(58) Field of Classification Search ............. 52/309.11, 52/309.7, 309.12, 309.16, 309.17, 223.6, 52/414, 649.1, 649.3, 834, 835, 740.1, 838, 52/839, 843, 514, 514.5; 264/35; 428/703, 428/297.4

See application file for complete search history.

(56) References Cited

U.S. PATENT DOCUMENTS

| | | | | |
|---|---|---|---|---|
| 411,360 A * | 9/1889 | Stempel et al. | ............... | 256/57 |
| 3,473,285 A * | 10/1969 | Reiland | ............... | 52/745.17 |
| 3,604,180 A * | 9/1971 | Wood | ............... | 52/649.3 |
| 3,879,908 A * | 4/1975 | Weismann | ............... | 52/309.5 |
| 4,125,981 A * | 11/1978 | MacLeod et al. | ......... | 52/309.12 |
| 4,226,067 A * | 10/1980 | Artzer | ............... | 52/309.12 |
| 4,229,497 A * | 10/1980 | Piazza | ............... | 428/71 |
| 4,409,764 A * | 10/1983 | Wilnau | ............... | 52/127.3 |
| 4,472,331 A * | 9/1984 | Kida | ............... | 264/31 |
| 5,025,605 A * | 6/1991 | Sekijima et al. | .......... | 52/309.16 |
| 5,218,810 A * | 6/1993 | Isley, Jr. | ............... | 52/834 |
| 5,326,410 A * | 7/1994 | Boyles | ............... | 156/71 |
| 5,367,854 A * | 11/1994 | Kim | ............... | 52/745.13 |
| 5,392,580 A * | 2/1995 | Baumann | ............... | 52/660 |
| 5,440,845 A | 8/1995 | Tadros et al. | | |
| 5,505,030 A * | 4/1996 | Michalcewiz et al. | ......... | 52/249 |
| 5,599,599 A * | 2/1997 | Mirmiran et al. | ........... | 428/36.3 |
| 6,088,985 A | 7/2000 | Clark | | |

(Continued)

*Primary Examiner*—Richard E Chilcot, Jr.
*Assistant Examiner*—James Ference
(74) *Attorney, Agent, or Firm*—Thorpe North & Western LLP

(57) ABSTRACT

Composite wall panels are a viable method of quick and inexpensive building. Providing a composite wall panel with increased shear resistance and axial load capacity is extremely desirable. A fiber reinforced polymer (FRP) cage incorporated into composite wall panels which forms a wall panel with these desirable characteristics and a method of forming such a composite wall panel is disclosed and described. The FRP cages can include FRP shells or sleeves which include two or more bars secured thereto. One or more FRP cages can be incorporated into a composite wall panel where a portion of the FRP shell is imbedded in each of two concrete layers with an insulation layer therebetween. The resulting FRP reinforced composite wall panel has improved shear resistance and axial compressive strength which can allow for use in load bearing applications and generally improved properties such as thermal insulation.

18 Claims, 10 Drawing Sheets

U.S. PATENT DOCUMENTS

| | | |
|---|---|---|
| 6,116,836 A | 9/2000 | Long, Sr. |
| 6,123,485 A * | 9/2000 | Mirmiran et al. ............ 405/252 |
| 6,226,942 B1 * | 5/2001 | Bonin .................... 52/309.12 |
| 6,284,336 B1 * | 9/2001 | Greene ................... 428/36.91 |
| 6,293,071 B1 * | 9/2001 | Konstantinidis .............. 52/659 |
| 6,309,732 B1 | 10/2001 | Lopez-Anido et al. |
| 6,460,213 B1 * | 10/2002 | Flint et al. ..................... 14/73 |
| 6,467,118 B2 | 10/2002 | Dumlao et al. |
| 6,544,624 B1 | 4/2003 | Lopez-Anido et al. |
| 6,591,567 B2 | 7/2003 | Hota et al. |
| 6,630,221 B1 * | 10/2003 | Wong ........................ 428/117 |
| 6,705,055 B2 * | 3/2004 | Ritter et al. .............. 52/309.11 |
| 6,718,712 B1 * | 4/2004 | Heath .................... 52/309.12 |
| 6,864,297 B2 * | 3/2005 | Nutt et al. .................... 521/54 |
| 6,889,479 B2 | 5/2005 | Thorpe |
| 6,898,908 B2 * | 5/2005 | Messenger et al. ............ 52/268 |
| 6,938,390 B2 * | 9/2005 | Maeda et al. ................. 52/834 |
| 6,972,144 B2 * | 12/2005 | Roth et al. .................... 428/68 |
| 6,986,231 B2 * | 1/2006 | Koszo ......................... 52/834 |
| 7,131,161 B2 * | 11/2006 | Lee ............................... 14/73 |
| 7,371,451 B2 * | 5/2008 | Messinger .................. 428/174 |
| 7,421,827 B1 * | 9/2008 | Konstantinidis .............. 52/698 |
| 2002/0066581 A1 * | 6/2002 | Bashford ...................... 174/50 |
| 2003/0029107 A1 * | 2/2003 | Ritter et al. ............... 52/309.11 |
| 2003/0115831 A1 * | 6/2003 | Long, Sr. ................. 52/786.13 |
| 2004/0065034 A1 * | 4/2004 | Messenger et al. ....... 52/309.11 |
| 2005/0183381 A1 * | 8/2005 | Rosenberg ................. 52/721.2 |
| 2005/0258572 A1 * | 11/2005 | Messenger et al. .......... 264/333 |
| 2006/0277837 A1 * | 12/2006 | Wilsey ....................... 52/79.1 |
| 2007/0062144 A1 * | 3/2007 | Moon ....................... 52/481.1 |

* cited by examiner

FRP COMPOSITE WALL PANELS AND METHODS OF MANUFACTURE

RELATED APPLICATIONS

This application claims the benefit of earlier filed U.S. Provisional Patent Application No. 60/684,642, filed May 25, 2005, which is incorporated by reference herein in its entirety.

FIELD OF THE INVENTION

The present invention relates to devices and methods for use in connection with structural materials. More particularly, the present invention relates to methods and materials for making composite concrete panels using fiber reinforced polymer materials. Accordingly, the present invention involves the fields of materials science, civil engineering, and chemistry.

BACKGROUND OF THE INVENTION

Preformed concrete panels are a popular and economic method of constructing a variety of structures. Of particular interest are composite concrete panels. Composite concrete panels are most often manufactured and used for thermal insulation purposes. Typically a composite panel is comprised of three layers, a middle insulation layer and two outer concrete layers or wythes which sandwich the middle insulation layer. Walls of this type are often called sandwich walls. The insulation layer often consists of a 3 inch Styrofoam® sheet. Generally, one of the concrete layers in the composite panel is substantially thicker than the other. In a typical composite panel the three layers are generally only held together with steel bar anchors.

Typical composite panels have two major disadvantages. First, they have a very small shear resistance. Most of the shear of a typical sandwich panel occurs in the middle third of the panel where the insulation layer lies. Because the insulation layer has nearly no shear resistance this makes typical composite panels susceptible to shear failure. The second disadvantage of typical composite panels is that they cannot be used in load bearing and structural applications.

In recent years, fiber reinforced polymer (FRP) composites have emerged as an alternative to traditional materials for strengthening of various structures. The light weight of the material, high-strength to weight ratio, corrosion resistance, and high efficiency of construction are among many of the advantages of this material. Efforts have been made by some researchers to use FRP bars to reinforce composite panels by either replacing the steel with FRP bars or by attempting to use FRP bars to produce a truss-like action inside the composite panel. Unfortunately, these efforts have failed to satisfactorily increase the shear resistance capability or axial load capacity of the composite panel. As such, methods and systems for increasing shear resistance capability and axial load capacity of composite wall panels continues to be sought.

SUMMARY OF THE INVENTION

Accordingly, the present invention provides a composite wall panel with increased shear resistance and axial load capacity. The wall of the present invention incorporates fiber reinforced polymer (FRP) cages into the composite wall panels that secure the layers of the panels against multiple forces, including shear.

One aspect of the present invention provides for a method of manufacture of a composite wall incorporating the FRP cages. The FRP cages can be made by securing bars to FRP shells. FRP shells can be made by wrapping FRP sheets around forms and curing the sheets. An insulation layer can be placed inside of the FRP cage, creating opposing bottom and top spaces between the insulation layer and the FRP shells of the cage. An FRP cage can be arranged in a concrete casting structure so that the bottom space runs longitudinally near the bottom of the concrete casting structure. A first layer of concrete can also be poured into the concrete casting structure so as to substantially fill the bottom space. A layer of insulation can then be disposed on the exposed surface of the concrete and then a second layer of concrete is poured into the concrete casting structure. The second layer of concrete can fill the concrete casting structure sufficiently to cover the insulation layer, the top space, and the FRP cage. The concrete in the concrete casting structure can then be cured in the casting structure to form the final composite wall panel.

DETAILED DESCRIPTION

Figure 1:
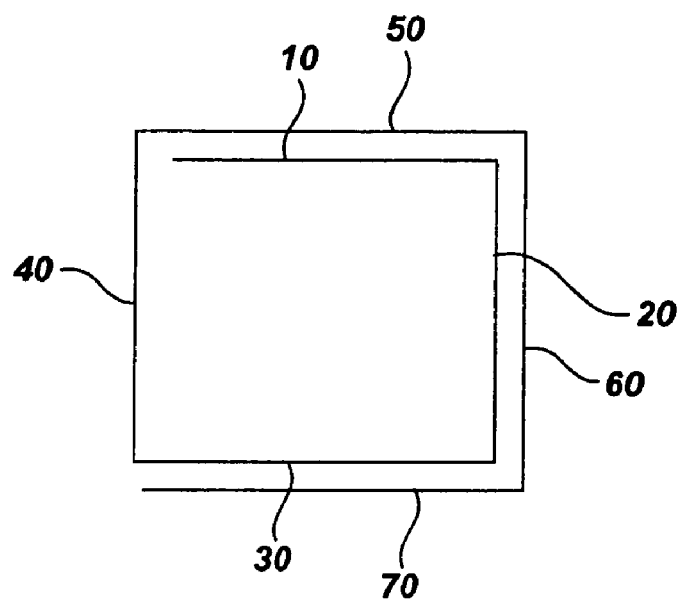
FIG. 1 is an overhead plan view of a fiber reinforced polymer shell in accordance with one embodiment of the present invention showing the wrapping sequence for a fiber reinforced polymer shell.

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It must be noted that, as used in this specification and the appended claims, the singular forms "a," "an," and "the" include plural referents unless the context clearly dictates otherwise. Thus, for example, reference to "a layer" includes one or more of such layers, reference to "a shell" includes reference to one or more of such structures.

DEFINITIONS

In describing and claiming the present invention, the following terminology will be used in accordance with the definitions set forth below.

As used herein, the term "shear resistance" or "horizontal shear resistance" refers to the ability of the layers of a composite wall panel to resist shifting or slipping with respect to each other.

As used herein, "sheet" refers to a material that has a thickness substantially smaller than the width and length. The term sheet is intended to encompass thin sheets, pultruded composites, and the like. Furthermore, as used herein, the term "layer" shall be understood to include substantially continuous material, in sheet form wherein the thickness is substantially smaller than the width and length.

As used herein, "cage" refers to a partially enclosed structure having a continuous surface, which surrounds an interior space in at least one plane. For example, cages can include a shell having two openings on opposing ends of the shell with bars attached to inner surfaces of the shell. The shells can be open ended boxes or cylindrical shapes. The shell structure can have a shape which allows for hoop reinforcement from a first concrete wythe to a second concrete wythe across an insulation layer so as to confine concrete and bars encompasses within the shell. Typically, the shells can be a sleeve.

As used herein, with respect to an identified property or circumstance, "substantially" refers to a degree of deviation that is sufficiently small so as to not measurably detract from the identified property or circumstance. The exact degree of deviation allowable may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited.

As an illustration, a numerical range of "about 1 inch to about 5 inches" should be interpreted to include not only the explicitly recited values of about 1 inch to about 5 inches, but also include individual values and sub-ranges within the indicated range. Thus, included in this numerical range are individual values such as 2, 3, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

Reference will now be made to exemplary embodiments and specific language will be used herein to describe the same. It will nevertheless be understood that no limitation of the scope of the invention is thereby intended. Alterations and further modifications of the inventive features described herein, and additional applications of the principles of the invention as described herein, which would occur to one skilled in the relevant art and having possession of this disclosure, are to be considered within the scope of the invention. Further, before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

INVENTION

In accordance with the present invention, composite wall panels can be manufactured using FRP cages that strengthen the composite wall panel by providing increased shear resistance and axial load capacity. The FRP cage used in the present invention can be made by securing bars to FRP shells. The FRP shells can be formed by wrapping FRP sheets around a form and curing the sheets on the form. After the sheets are cured the forms can be removed leaving the cured FRP shells.

Typically, the shells are sleeves with four equal sides; however, the shells can also be sleeves formed into almost any desirable shape, e.g. having a rectangular, elliptical, square, triangular, circular, or polygonal cross-section. To make an FRP cage, a fiber reinforced polymer sheet can be wrapped around a form. The FRP material is then allowed to cure or set. Once cured, the form may be removed from the FRP shell. FIG. 1 shows a wrapping sequence whereby the FRP material can be wrapped around a square-shaped form. Wrapping may be done in any manner customary in the art. In this case, the edge of the FRP material is secured to the form and is wrapped around a form edge to create the first side 10 of the shell. Extending the FRP material and folding around the edges of the form continues to create side 20, side 30 and side 40. At this point, the FRP material can be extended and folded whereby side 50 covers side 10; side 60 covers side 20; and side 70 covers side 30. Any excess FRP material at the edge of side 70 (nearest side 40) may be cut and removed. The FRP-wrapped form can then be cured. The FRP material can be wrapped to form multiple layers and can typically have from about 2 to about 10 layers, and preferably from about 2 to about 3 layers.

The FRP sheets can be cut and formed so as to make FRP shells of various sizes and shapes. In the embodiment of FIG. 1, and by way of example, the starting sheets of FRP material can be 6 inches by 42 inches long. The form used can be a 6 inch×6 inch steel pipe to form square sleeve shaped FRP shells. Alternatively, the form can be any suitable material. For example, the form can be a reusable molded plastic form, wooden form, or other similar materials which retain shape sufficiently to form the desired FRP shell.

Figure 2:
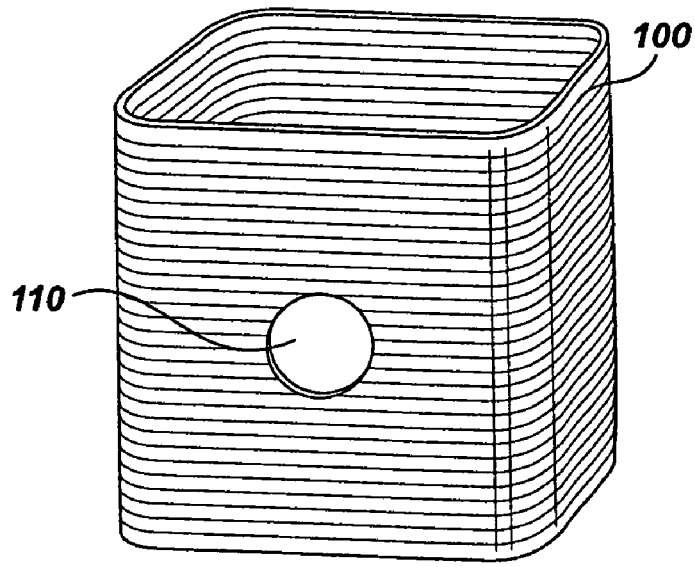
FIG. 2 is a perspective view of a cured fiber reinforced polymer shell, showing a hole in the structure, in accordance with one embodiment of the present invention.

The final FRP shell product, once removed from the form, can be a hollow sleeve or shell. The height of the shell is determinable by the width of FRP material used in the wrapping procedure. The upper and lower sides of the shell are open, and the FRP material is continuous around the four sides of the shell. FIG. 2 shows a generally square-based FRP shell 100 after curing. This shell is a sleeve having four sides of substantially equal height and width. The cured FRP material 100 continuously extends around four sides. The other two sides (called upper and lower for reference purposes) are open. FIG. 2 further exemplifies an optional embodiment wherein holes are present in two sides of the shell. Opposing holes can be made in the FRP shells to facilitate the flow of concrete during the construction of the composite wall panels and also improve the horizontal shear resistance of the panels. In the embodiment discussed for FIG. 1, one and one half inch holes can be made in the centers of opposing sides of an FRP shell. These holes, in general, facilitate the manufacture of the composite wall and help to increase the anchoring of the shell into each concrete layer. The holes specifically aid in the concrete pouring steps. In FIG. 2, the hole 110 is centered in one side. A second hole can be similarly positioned on the opposite wall of the shell. As a variety of shell geometries may be used, the holes may be present in a variety of numbers and configurations, depending on the application. Depending on the FRP material, it is preferred that the holes be made following wrapping the FRP material around a form and after curing.

There are a variety of different types of FRP sheets that can be used in the present invention including, but not limited to, carbon fiber reinforced polymer sheets, glass fiber reinforced polymer sheets, and aramid fiber reinforced sheets. Combinations and composites of the various FRP materials may also be used in accordance with the present invention, e.g. polyethylene FRP. Glass fiber reinforced polymer sheets are used in the preferred embodiment of the present invention. Some current commercial examples of suitable glass fiber reinforced polymer sheets include Sika® and Air Logistics® Aquawrap®. When Sika® brand FRP materials are used the sheets can be saturated with a thin epoxy resin before they are wrapped around the forms. The forms can then be covered with a plastic sheet and cured. The Air Logistics® Aquawrap® sheets are typically pre-impregnated with urethane resin. When Air Logistics® Aquawrap® are used, the FRP sheets can be wrapped around the forms and sprayed with water to cure the pre-impregnated resin. The wrapped forms can be wrapped with shrink-wrap plastic sheets to aid in consolidation of the forms while the sheets cure to form the FRP shells. In each case, the wrapped forms can be left to cure for about three days at which time the forms are removed from the cured FRP shells.

Figure 3:
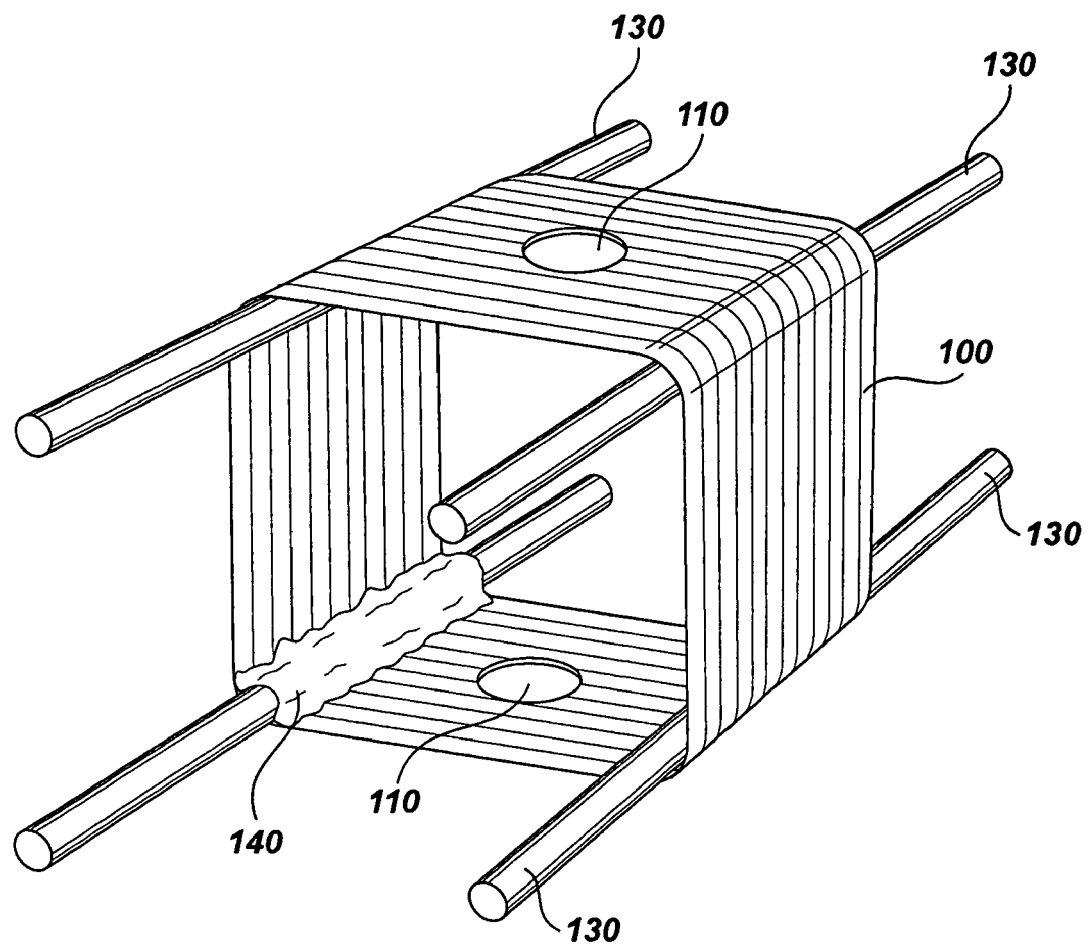
FIG. 3 is a perspective view of a fiber reinforced polymer cage having a fiber reinforced polymer shell secured to four bars, wherein the bars are adhered to the inside corners of the fiber reinforced polymer shell in accordance with one embodiment of the present invention.

To create FRP cages from the FRP shells, the shell can be secured to at least a pair of bars. Typically, four bars are used, one being oriented in each corner of a generally square FRP shell. FIG. 3 shows the FRP material 100 making up four walls of a generally square FRP shell. The shell contains two holes 110 in opposite sides to facilitate manufacture of the composite wall panel as discussed below in more detail.

Secured at each corner of the FRP shell is are bars 130 for a total of four bars corresponding to the four corners of the square FRP shell. The bars 130 extend the length of the corners, and continue beyond the FRP material 100 in both directions. In this embodiment, the bars 130 are adhered to the inside corners of the shell using an adhesive 140. In one embodiment, the bars 130 may be adhered by use of a glue 140 such as an epoxy or urethane resin. The adhesive used may also be the same resin used in forming the FRP shell, or a high-strength adhesive glue. A non-limiting example of a glue that can be used for securing the bars to the FRP shells/sleeve includes Sikadur® Injection Gel.

In general, the bars 130 are linear (as in FIG. 3), but non-linear bars may also be used. The bars 130 can be made from a variety of materials including steel, fiber reinforced polymer composites, mild steel, prestressing tendons, or metal composites. In one embodiment the bars 130 can be #4 steel bars. In another embodiment, the bars can be fiber reinforced polymer composite bars. The bars 130 can be arranged substantially in parallel and the FRP shells are secured to the bars in such a way as to form an interior space defined by the bars and the FRP shells. Although four bars are preferred for FRP cages that are substantially square, any number of bars can be used to add strength to the composite wall. Generally, though, at least two bars can be used (four bars are preferred) for most cage geometries such that at least one bar (and preferably two bars) can be embedded in each of the outer concrete wythes.

Figure 4:
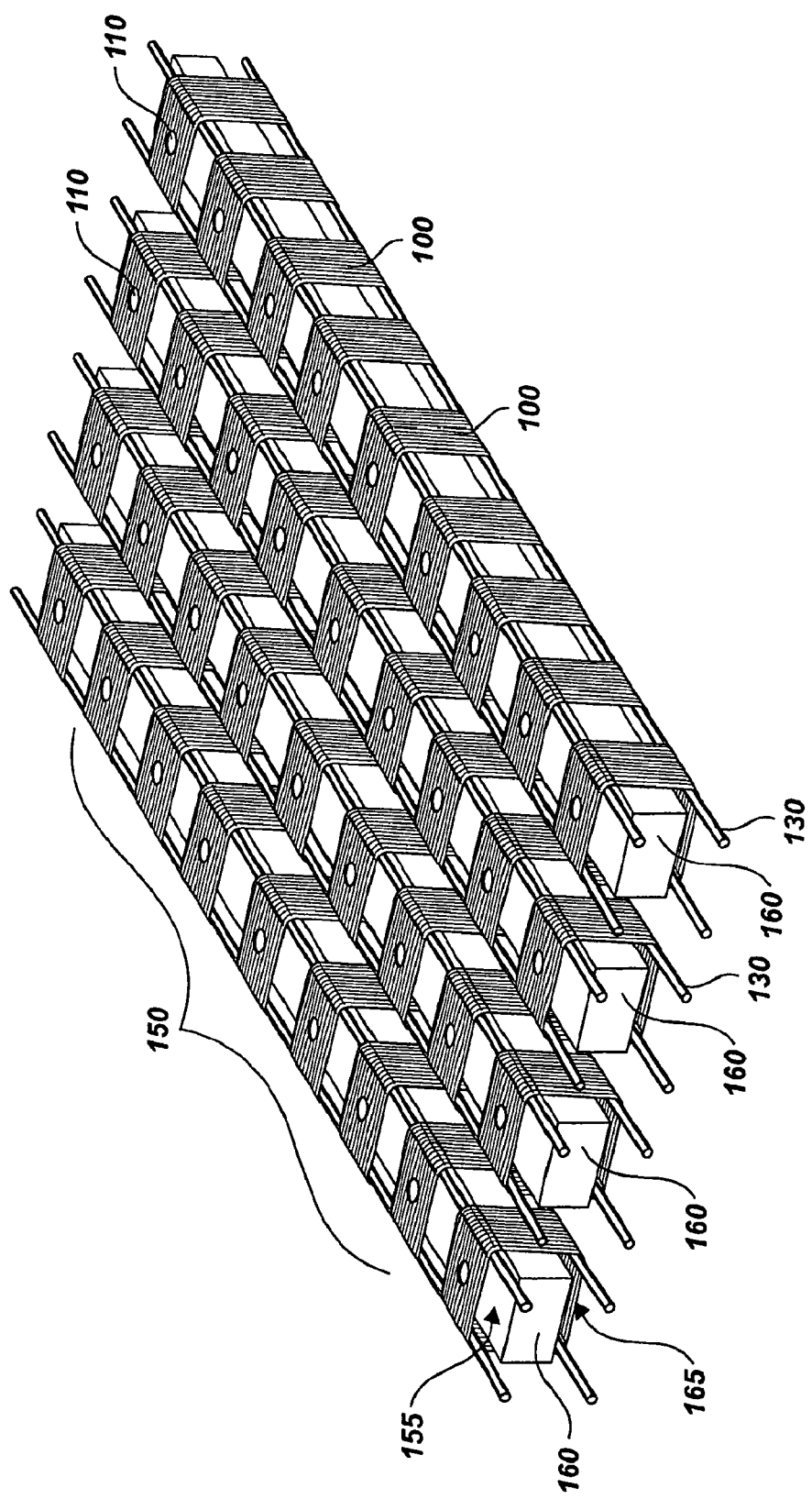
FIG. 4 is a top perspective view of four parallel fiber reinforced polymer cages, each line containing insulation material. Each line of cages has multiple fiber reinforced polymer cages intermittently spaced along four bars, in accordance with one embodiment of the present invention.

Multiple FRP shells can be connected along the same set of bars to form lines of shells. FIG. 4 shows four parallel lines of multiple shell cages 150. Each cage 150 in this embodiment contains nine FRP shells of generally square shaped sleeves. As with the other figures, the FRP shell 100 with holes 110 is secured to bars 130 at each of the four corners. The same set of four bars 130 are used for each of the shells in a multiple shell cage 150.

An insulating material 160 can be inserted into an interior space located between the bars of the cage 130 and defined by the bars and the FRP shells 100. The insulting material occupies a portion of the interior space and creates a top space 155 and a bottom space 165 with respect to the insulating material. The top and bottom spaces are defined as being between the FRP shell of the cage and the insulating material and are opposite one another. In this embodiment, the insulating material 160 is in the form of a continuous block that extends through the entire multiple shell cages 150. Alternate forms of insulating material depend on the specific type of insulation used. That said, the block may not be continuous, as in FIG. 4, may be of differing shapes, or may not be blocks at all. Likewise, the insulation layer may be segmented insulation blocks that fit one or more multiple cages. Furthermore, insulating material may be inserted into the FRP cages prior to assembly of the composite sandwich wall, or during assembly. The examples in the figures show the insulating material inserted prior to wall assembly, which is to be understood as the preferred method of insulating material insertion.

Insulating materials for use with the present invention can include polyurethane foam or any other insulating materials known in the art. Suitable insulation material can include spray foam or solid foams cut to the desired shapes. If the insulation material is inserted into the interior space of the cage before the first layer of concrete is poured the insulation layer may be retained against falling into the bottom so as to allow the concrete to fill the bottom space. Retention of the insulation layer can be accomplished by a variety of means including using tie wires, ropes or strings to lift the insulation above the bottom space. As noted earlier, as an alternative, the insulation layer may be placed in the cage after the first layer of concrete is poured. The thickness of the insulation can vary depending on the desired final specifications of the composite wall panel. As a general guideline, the insulation layer can have a thickness from about one-half inch to about six inches, but a preferred thickness is two to four inches, and most often about three inches.

Figure 5:
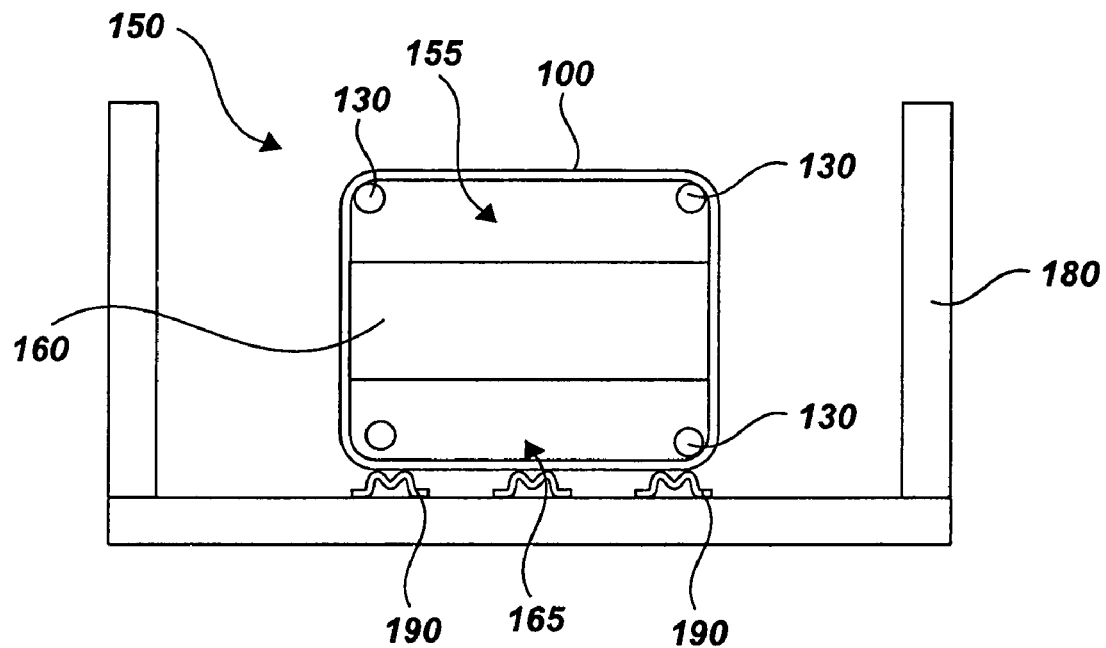
FIG. 5 is a side view of a concrete casting structure containing an FRP cage resting atop shoes in accordance with one embodiment of the present invention.

The cage can be arranged in a concrete casting structure 180 such that the bottom space 165 is disposed longitudinally near the bottom of the concrete casting structure as shown in FIG. 5. The term "near" is defined to be a distance sufficient to allow concrete to flow between the concrete casting structure 180 and the cage so as to substantially surround the cage with an amount of concrete sufficient to provide structural support for the wall panel. The required distance can depend largely on the intended application and designed vertical stresses. Generally, the concrete casting structure can be suspended from about one-half inch to about three inches, and typically from about three-fourths inches to about one-and-a-half inches. In one preferred embodiment, the cage 150 and/or steel bars 130 can be kept from resting on the bottom of the concrete casting structure by using metal shoes 190 as spacers shown in FIG. 5, which support the cage. The embodiment in the figure shows use of three shoes 190 to maintain the cage above the floor of the concrete casting structure 180 during manufacture of the composite wall panel. The number and type of shoes 190 used depends on the application and may be affected by the geometry of the cage, FRP material, etc.

Other methods of maintaining the cage above the bottom of the concrete casting structure include other supporting means onto which the cage may be set such as concrete or rock pieces as well as hanging or suspending the cage using strings, ropes, or wires.

Figure 6:
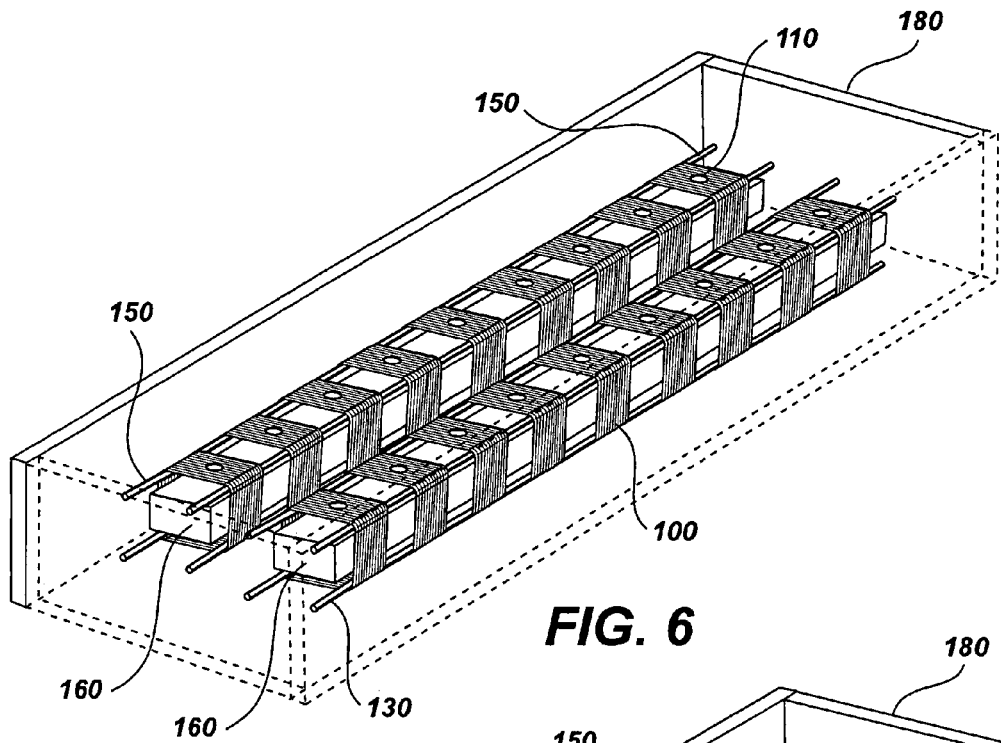
FIG. 6 is a top perspective view of a concrete casting structure containing two lines of fiber reinforced polymer cages, situated parallel to each other, in accordance with yet another embodiment of the present invention.

A further step in the manufacture of concrete composite wall panels in accordance with the present invention is shown in FIG. 6. In this figure, as with the early stages of manufacture, multiple shell cages 150 can be placed in a parallel relationship within the concrete casting structure 180. The concrete casting structure 180 has a bottom and sides that correspond to the size of the desired finished wall or segment thereof. In FIG. 6, the finished wall piece will be rectangular. The cages 150 are placed in the concrete casting structure 180 in a manner so as to keep the FRP cages from resting directly on the bottom. Although not visible in this figure, shoes are preferably used to keep the cages from resting along the bottom of the concrete casting structure 180. If the FRP cages have holes 110 the holes are preferably directed so that at least one hole of each cage is facing the bottom of the concrete casting structure 180 and at least one hole 110 of each cage is facing upward. In one preferred embodiment, and depending on the thickness of the cement layer and overall finished wall thickness, the cage and/or steel bars 130 can typically be disposed about 1 inch from the bottom of the concrete casting structure.

After the cages are arranged in the concrete casting structure 180, a first layer of concrete 200 can be poured into the casting structure sufficient to fill the casting structure to a level such that the bottom space is substantially filled with concrete. This step in the process can be seen in FIG. 7, wherein the concrete 200 is in a layer along the bottom of the concrete casting structure 180. The first concrete layer 200 covers a lower portion of the FRP shells 100 of each cage 150, as well as two of the four bars 130 of each cage. In this embodiment, the first concrete layer can be poured in one stage, relying on methods such as those discussed above to keep the FRP cages above the floor of the concrete casting structure 180 and keeping the insulation material 160 above the concrete level.

Figure 7:
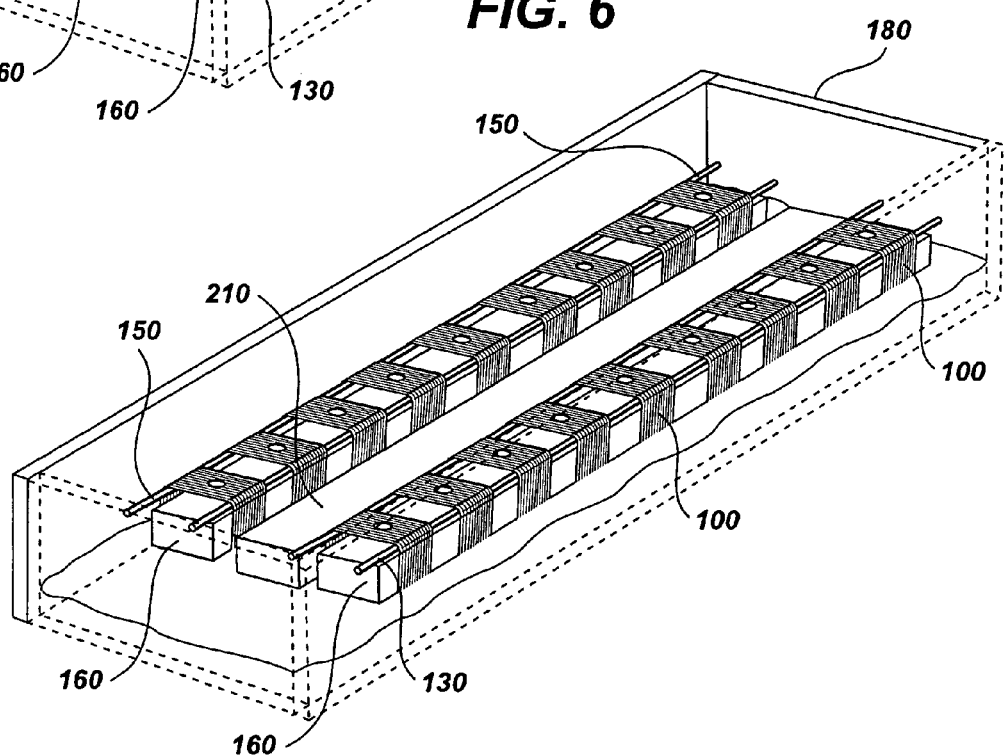
FIG. 7 is a top perspective view showing a concrete casting structure containing two lines of fiber reinforced polymer cages, after the first layer of concrete was poured and having insulation material disposed on the first concrete layer, in accordance with one embodiment of the present invention.

Alternatively, the first layer of concrete may be poured in two stages. The first stage can involve pouring a thin layer of concrete into a concrete casting structure containing no cage. A cage can be then placed on the exposed surface of the concrete and the remaining portion of the first layer of concrete can be poured so as to substantially fill the bottom space. In a preferred embodiment (as shown in FIG. 7) of the present invention the cage can be disposed near the bottom of the casting structure 180 prior to the pouring of the first layer of concrete 200. The first layer of concrete 200 can be then poured in one stage so that the bottom space is substantially filled with concrete. A concrete vibrator may be used throughout the concrete pouring process to enhance flow of the concrete into the cage and to create a concrete layer that is uniform and substantially without voids. If excess concrete is added to the concrete casting structure during the pouring of the first concrete layer the excess concrete may be removed.

After the first layer of concrete is poured, an insulation layer can be disposed onto the exposed portions of the concrete as shown in FIG. 7. The insulation layer 210 can cover substantially all exposed portions of the concrete layer 200. Exposed concrete along edges between the cages 150 and side walls of the casting structure can also have insulation layer placed thereon. Alternatively, these edges can be left exposed such that the final product has the insulation substantially encased within concrete along all edges. The insulation layer can generally extend to the edges of the panel in FIG. 7 not only in the middle between the cages. As a result, a continuous layer of insulation through the panel exists at substantially all points. If wires, ropes or strings were used to retain the insulation material 160 within the cages, these can be cut and the insulation material can be released or lowered onto the first concrete layer 200.

A second layer of concrete can be then poured into the casting structure sufficient to cover the insulation layer, the top space, and the cage. When pouring of the second layer of concrete is complete, the concrete can be cured. In one embodiment of the present invention a plurality of cages can be used in the manufacture of a composite wall panel. Almost any number of cages can be used in each composite wall panel depending on the desired dimensions.

Using the above-described methods, a composite wall panel can be produced. Thus, the final composite wall panels of the present invention can include fiber reinforced polymer cages. Further, these composite wall panels can include a first concrete layer, an insulation layer adjacent to the first concrete layer, a second concrete layer adjacent to the insulation layer and opposite the first concrete layer, and at least one fiber reinforced polymer cage which is at least partially embedded in each of the first and second concrete layers.

Figure 8:
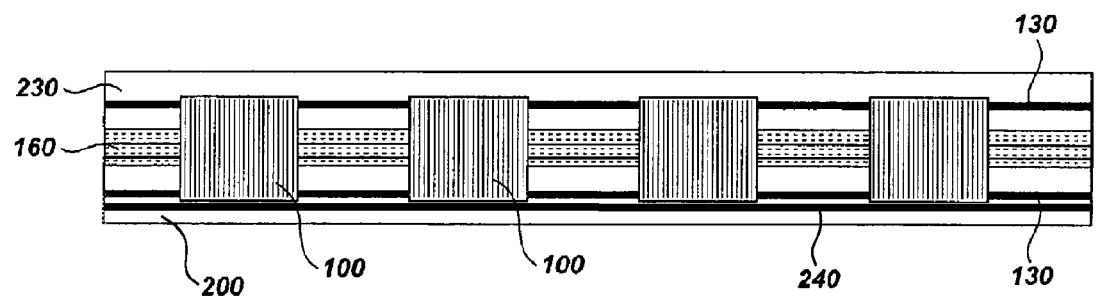
FIG. 8 is a cross-sectional view of a composite wall panel, as taken through the width of the panel and parallel to the bars in accordance with one embodiment of the present invention.

FIG. 8 illustrates a cross-sectional view of a completed composite wall panel wherein the cross-section is taken parallel to one of the cages. As can be seen a lower bar 130 is embedded in the first layer of concrete 200. The insulating layer 160 is shown adjacent the first layer of concrete within the shells 100. Similarly, an upper bar 130 is embedded in the second layer of concrete 230. Each shell spans from the first concrete layer to the second concrete layer across the insulating layer.

Figure 9:
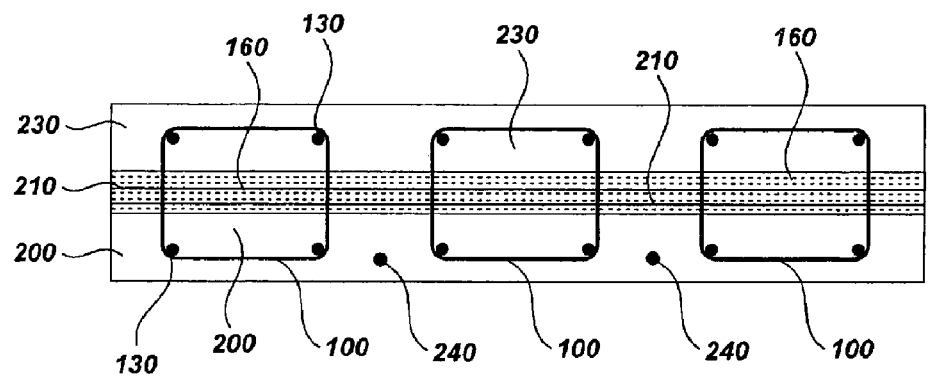
FIG. 9 is a cross-sectional view of a composite wall panel, as taken through the width of the panel and perpendicular the bars, containing three FRP cages in accordance with one embodiment of the present invention.

FIG. 9 shows a cross-sectional view of a completed composite wall panel, as taken through the width of the panel and perpendicular to the length of the cages, containing three FRP cages in accordance with one embodiment of the present invention. From this figure, one can see the FRP shell 100 forming a nearly square shape. The bars 130 are connected to the FRP material in each corner. The first layer of concrete 200 fills a lower portion of each shell and between and around the lower portions of the cages. The insulation material 160 inside the FRP cages and the insulation layer 210 outside the cages act as a single layer throughout the composite wall panel. The second layer of concrete 230 fills corresponding spaces above the insulating layers.

In one embodiment of the present invention the first and second concrete layers of the composite wall panel are substantially of equal height and width (as is shown in FIG. 8). The thickness of the first and second concrete layers 200 and 230 respectively, can generally be equal but may also vary independent of each other. Generally, the first and second concrete layers 200 and 230 respectively, can have a thickness ranging from about 2 to about 10 inches, but a preferred thickness of from about 2 to about 6 inches can also be used.

Incorporating prestressed tendons into the first and/or second layers of concrete can provide further strengthening of composite wall panels. The tendons are generally arranged to be substantially parallel to the fiber reinforced polymer cage (s) in the panel, but can also be arranged in other orientations. One example of the location of prestressed tendons within a panel is shown in FIG. 8. Here, the prestressed tendons 240 run parallel to the bars 130 and are situated between the FRP cages in the first concrete layer 200. In one embodiment, prestressed tendons can be placed closer to the bars and FRP cages or can be oriented perpendicular to the bars 130. In yet another embodiment, the prestressed tendons can be incorporated in both concrete layers.

In addition to providing increased shear resistance, the FRP shells further decrease the thermal conductivity of the composite wall panel. Specifically, the thermal conductivity of Glass FRP composites is 0.04 W/mK (0.28 BTU-in/hr-ft$^2$-° F.) is closer to the value of 0.01 W/mK (0.07 BTU-in/hr-ft$^2$-° F.) for Styrofoam®, as opposed to 50 W/mK (346.65 BTU-in/hr-ft$^2$-° F.) for mild steel reinforcement and 0.8 W/mK (5.55 BTU-in/hr-ft$^2$-° F.) for concrete. These properties illustrate the thermal advantage to FRP composites in general, regarding thermal insulation performance. Thus, the composite wall panels of the present invention can provide increased thermal insulation useful in a number of applications such as refrigeration buildings, storage, and general-purpose buildings.

The FRP shell can be embedded in each of the first and second concrete layers such that the fiber reinforced polymer cage secures the first concrete layer with respect to the second concrete layer. In this way, the FRP cage acts as a reinforcing member across an insulation layer to secure the two outer concrete layers. The FRP shells, which traverse the insulation layer, are typically substantially perpendicular to the concrete layers. Thus, the FRP shell dramatically improves the shear resistance of the composite wall, particularly in a direction parallel with the shell material. Thus, in some embodiments it can be desirable to place multiple FRP cages oriented in differing directions such that shear resistance in multiple directions is improved. For example, one or more FRP cages can be placed perpendicular to one or more FRP cages in a lattice type arrangement.

In summary, FRP cages or shells in accordance with the present invention can establish a composite structural action in which both wythes resist flexural and axial loads, while maintaining thermal insulation across the two wythes of the composite panel. The shear strength of the sandwich panel is increased by the shear capacity of the FRP composite shells. In addition, the axial compression capacity of the sandwich panel is also enhanced since the FRP composite shells confine the concrete and act as hoop reinforcement that prevents separation of the two wythes and postpones buckling of the longitudinal steel bars.

EXAMPLE

The following example illustrates various methods of making FRP shells and composite walls in accordance with the present invention. However, it is to be understood that the following are only exemplary or illustrative of the application of the principles of the present invention. Numerous modifications and alternative compositions, methods, and systems can be devised by those skilled in the art without departing from the spirit and scope of the present invention. The appended claims are intended to cover such modifications and arrangements. Thus, while the present invention has been described above with particularity, the following Examples provide further detail in connection with several specific embodiments of the invention.

A number of 30 FRP shells were made using Sika unidirectional glass FRP in sheets of 6 inches×42 inches for each shell. The FRP material was soaked in epoxy resin and then wrapped around a 6 inch×6 inch steel pipe to form a square sleeve-shaped FRP shell. The fibers followed the direction of the wrapping, and the material was folded six times, consistent with the wrapping shown in FIG. 1. The FRP wrapped around the pipe was then allowed to cure at ambient conditions over about three days. Once the curing was complete, the FRP shell was removed by sliding the shell off of the pipe.

Additionally, after curing, two holes in opposite sides were cut from the FRP wrapping. The holes were 1.5 inches in diameter and were centered both horizontally and vertically on each face.

Two fiber reinforced polymer cages were created from the above shells. Each cage included 15 shells. Four #4 steel bars measuring 15 feet in length were attached to the insides of the shells. The first bar was placed along one of the corners so that the bar extended from the shell about 3 inches on one end. Sikadur injection gel was then applied to the bar and immediately surrounding interior surfaces of the shell. This procedure was repeated with the remaining three corners and the additional FRP material was allowed to cure. Each shell was spaced about 6 inches from the nearest shell along the bars.

A block of Styrofoam insulation was placed inside the cured FRP cage. The block had the dimensions of 6 inches×15 feet. With the block inserted, there remained about 1 inch space on the top of the block between the block and the shell and the insulation material was wide enough to contact each side of the shell when inserted.

A composite or sandwich wall was manufactured using two multiple shell cages. The inner dimensions of the casting structure were 8 inches×24 inches×15 feet. The cages were placed 6 inches apart and 3 inches from the walls of the casting structure. To keep the lines of cages from resting on the floor shoes 1.5 inches tall were used. The insulation of the line of cages was tied to the top of the cages using tie wires. The concrete was poured into the casting structure and spread using a vibrator to a finished layer of 2.5 inches thick. The tie wires were removed and the insulation material inside the FRP cages was allowed to rest on the concrete. Blocks of insulation having a thickness of 3 inches were placed on the open areas of concrete so as to create a nearly continuous insulation layer. A second layer of the concrete was then poured over the entire structure so as to fully cover the insulation, the open portions of the cages, and the cages themselves. The composite wall was then allowed to cure for 28 days.

Testing was done using four-point loading and data was collected using eight strain gauges on each of the FRP cages (four placed on steel rebar connected to the FRP material so as to alternate placement: i.e. if the cage is placed in wall-manufacturing position with a bottom side facing the ground, and the four bars are numbered 1-4 in a counter-clockwise direction, wherein 1 and 2 refer to bars attached to the top of the cage, then gauges on 1 and 3 would be on one side of the FRP material and gauges 2 and 4 would be on the opposite side of the FRP material. The remaining four gauges were placed in pairs on the two sides of the FRP cage without holes. Each pair of gauges had one secured in the direction of the fiber and another in the direction across the fiber direction. Additional equipment such as a load cell and displacement transducers were also used.

Test conditions were a monotonic load applied to the 24 inches wide wall face until failure. The resulting data was plotted as moment versus curvature for several specimens. Each plot shows both theoretically predicted behavior and actual testing results. The theoretical behavior was calculated using principles of mechanics and material properties at pre-cracking of the panels, at post-cracking, at yield of steel reinforcement and at ultimate moment capacity of the panel. In this way, the mechanical properties of the composite wall can be tested and designed to meet a particular application and design specifications without requirements of a proto-type. In the plots, the moment is presented in kip-ft and the curvature in microstrain per inch. Additional calculations were performed for finding the shear capacity of the panels based on shear flow principles. The calculations showed that the capacity in shear was greater than the shear demand. The experiments confirmed that none of the panels failed in shear.

Figure 10:
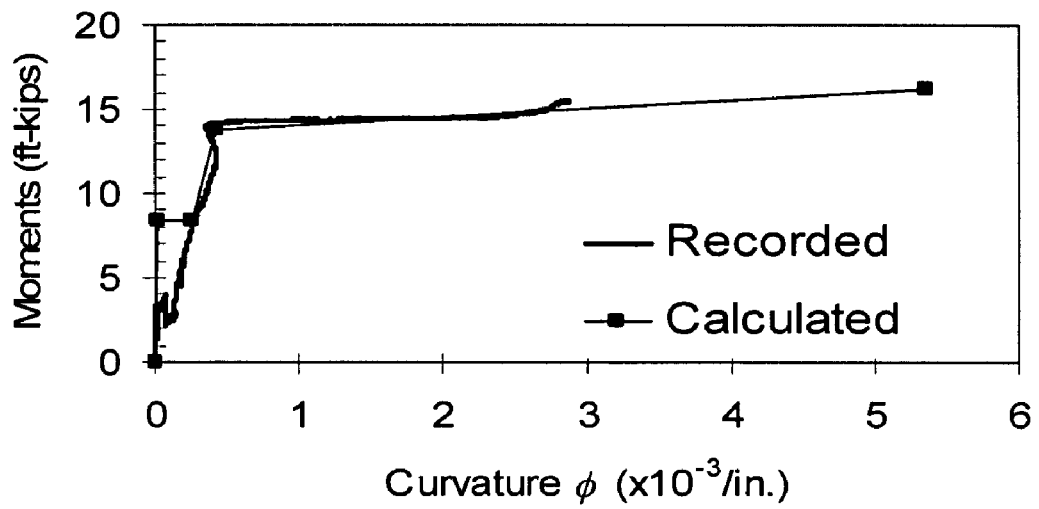
FIG. 10 is a chart showing Moment vs. Curvature for Sika Single Cage test (S1).
Figure 11:
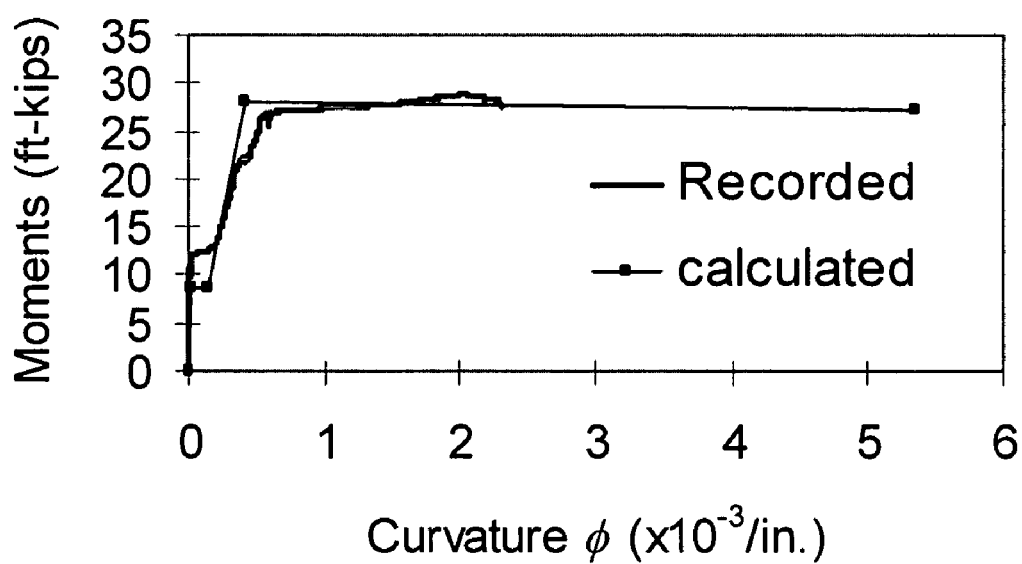
FIG. 11 is a chart showing Moment vs. Curvature for Sika Double Cage test (S2).
Figure 12:
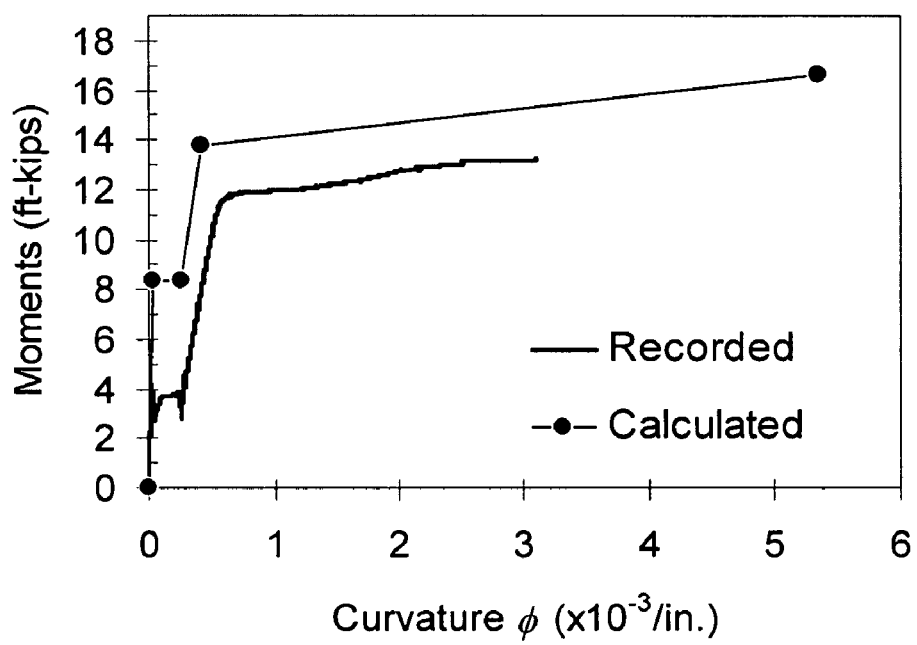
FIG. 12 is a chart showing Moment vs. Curvature for Air Logistics Single Cage test (AL1).
Figure 13:
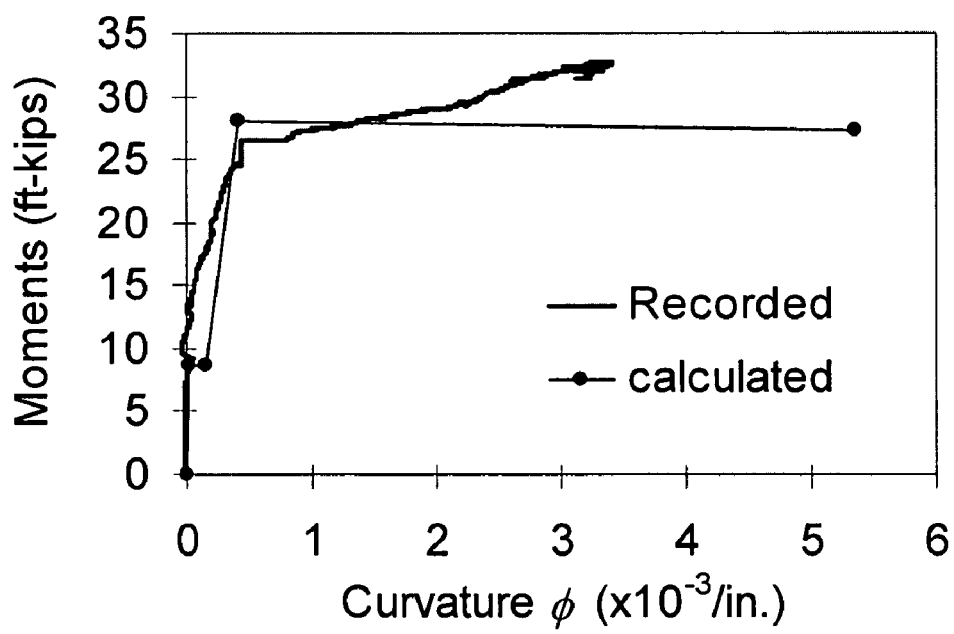
FIG. 13 is a chart showing Moment vs. Curvature for Air Logistics Double Cage test (AL2).
Figure 14:
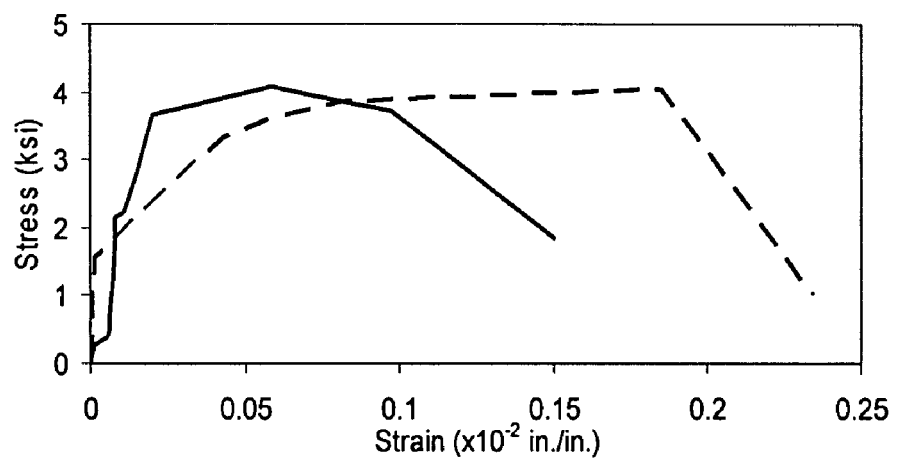
FIG. 14 is a chart showing Axial Compressive Stress vs. Strain for S1.
Figure 15:
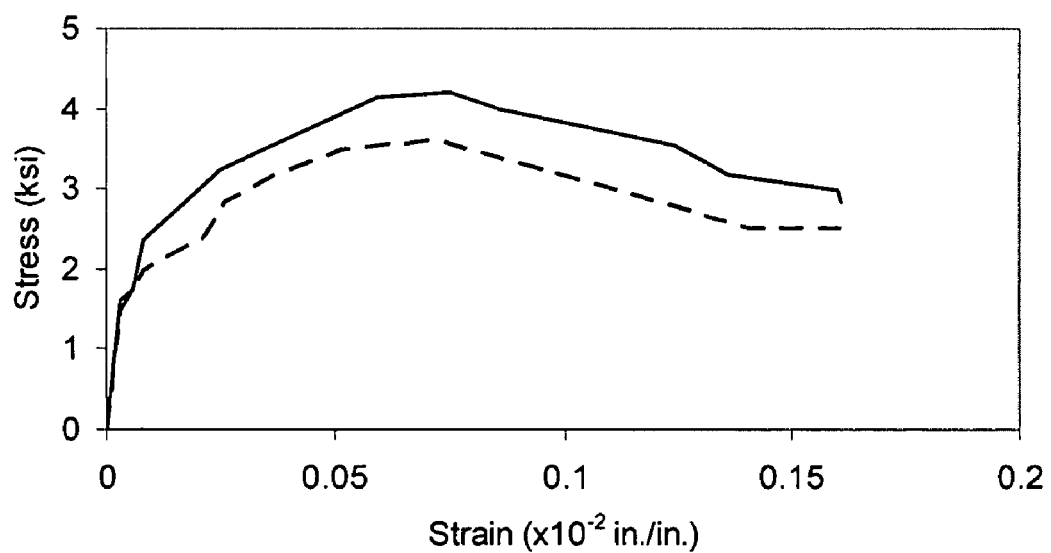
FIG. 15 is a chart showing Axial Compressive Stress vs. Strain for S2.
Figure 16:
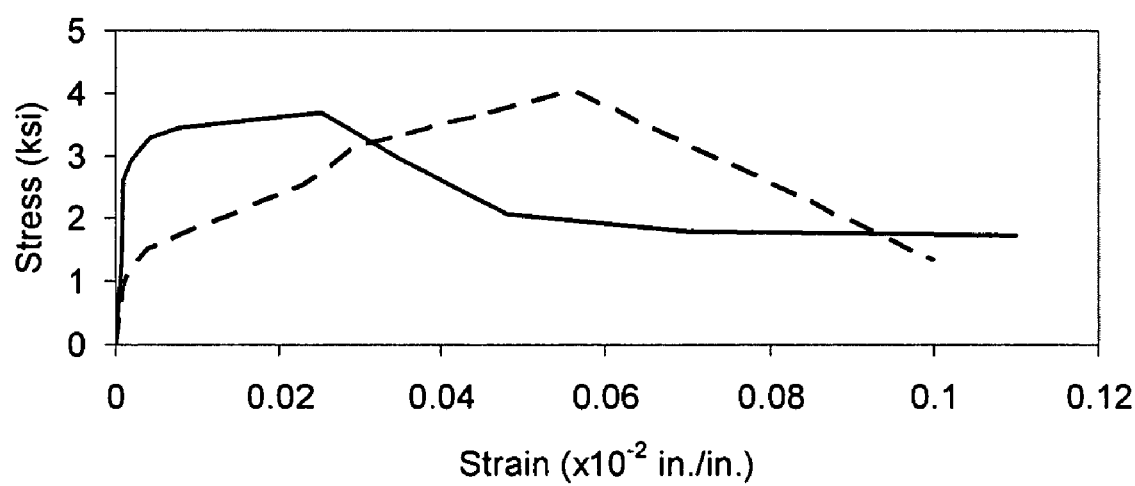
FIG. 16 is a chart showing Axial Compressive Stress vs. Strain for AL2.

These graphs can be found as FIGS. 10-13. In FIGS. 10 and 11 S1 and S2 refer to the Sika panels with one and two cages respectively. In FIGS. 12 and 13 AL1 and AL2 refer to the Air Logistics panels with one and two cages respectively. These charts show the excellent performance of the sandwich panels to high curvatures and the good agreement of the calculated versus experimental results. In addition to the moment versus curvature data, axial load tests in compression were performed. The axial compressive stress (in ksi) versus axial strain (in %) was plotted for three panel types (S1, S2, and AL2), each with two different specimens, as shown in FIGS. 14-16. These charts show that the axial capacity of the panels in compression is between 89% to 99% of the concrete compressive strength, which shows that the FRP box shells successfully held the two concrete wythes together in a composite action by confining the concrete inside them and postponing the buckling of the steel reinforcing bars.

The above experiments showed that the FRP reinforced sandwich panels can withstand large out-of-plane loads while maintaining shear integrity to a large deflection and displacement ductility. Both single and double GFRP cage panels were used in the tests. The single GFRP cage panels were under-reinforced and the concrete never reached the ultimate compressive strain, while the double GFRP cage panels were reinforced with sufficient steel reinforcement to cause a crushing failure of the concrete in the compression zone, after yielding of the tension reinforcement.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A composite wall panel comprising:
   a) a first concrete layer;
   b) an insulation layer adjacent to the first concrete layer, said insulation layer comprising segmented insulation blocks;
   c) a second concrete layer disposed adjacent the insulation layer and opposite the first concrete layer; and
   d) at least one fiber reinforced polymer cage having a pair of bars secured to at least one fiber reinforced polymer shell, wherein a portion of at least one fiber reinforced polymer shell is embedded in each of the first and second concrete layers such that the fiber reinforced polymer cage secures the first concrete layer with respect to the second concrete layer, wherein the at least one fiber reinforced polymer cage defining an interior space and the at least one fiber reinforced polymer shell is a partially enclosed structure having a continuous surface about the interior space and is formed of a sheet which surrounds at least a portion of each of the first concrete layer, the insulation layer, and the second concrete layer, wherein a segmented insulation block of the insulation layer is located within the interior space.

2. The composite wall panel of claim 1, wherein the fiber reinforced polymer shell is secured to four parallel bars, such that two of the four bars are embedded in the first concrete layer and two of the four bars are embedded in the second concrete layer.

3. The composite wall panel of claim 1, wherein the fiber reinforced polymer cage further contains an insulating material disposed in a central area of the cage.

4. The composite wall panel of claim 1, wherein pre-stressed tendons are incorporated into at least one of the first and second concrete layers of the wall panel and are substantially parallel to the at least one fiber reinforced polymer cage.

5. The composite wall panel of claim 1, wherein the fiber reinforced polymer shell comprises a material selected from the group consisting of glass fiber reinforced polymer shells, carbon fiber reinforced polymer shells, aramid fiber reinforced shells, and combinations or composites thereof.

6. A method for manufacturing composite wall panels, comprising the steps of:
   a) arranging at least one fiber reinforced polymer cage in a concrete casting structure such that a bottom space of the fiber reinforced polymer cage is spaced longitudinally near a bottom of the concrete casting structure and defines an interior space, said fiber reinforced polymer cage having a pair of bars secured to at least one fiber reinforced polymer shell which is a partially enclosed structure formed of a sheet having a continuous surface;
   b) pouring a first layer of concrete into the casting structure sufficient to fill the casting structure to a level such that the bottom space contains a layer of concrete;
   c) disposing an insulation layer onto at least a portion of the first layer of concrete, wherein a segmented block of the insulation layer is located within the interior space;
   d) pouring a second layer of concrete into the casting structure sufficient to cover the insulation layer, a top space inside the cage, and the cage such that interior space surrounds at least a portion of each of the first concrete layer, the insulation layer, and the second concrete layer; and e) curing the concrete.

7. The method of claim 6, further comprising the step of manufacturing the fiber reinforced cage by:
   a) forming at least one fiber reinforced polymer shell by wrapping a fiber reinforced polymer sheet around a form, curing said sheet to form the fiber reinforced polymer shell, and removing the form from the fiber reinforced shell; and
   b) securing two bars to at least one fiber reinforced polymer shell to form a cage.

8. The method of claim 7, wherein the fiber reinforced polymer shell is secured to four bars.

9. The method of claim 7, further comprising the step of disposing an insulating material into said cage prior to pouring the second layer of concrete.

10. The method of claim 9, wherein the insulating material is disposed between the pair of bars and defines the top space between the shell and the insulating material and the bottom space between the shell and the insulating material.

11. The method of claim 7, wherein the fiber reinforced polymer sheet comprises a member selected from the group consisting of glass fiber reinforced polymer sheets, carbon fiber reinforced polymer sheets, aramid fiber reinforced sheets, and combinations or composites thereof.

12. The method of claim 6, wherein the step of pouring the first layer of concrete into the casting structure is completed by pouring a first portion of concrete, followed by the step of arranging the at least one fiber reinforced polymer cage on the first portion of concrete, and then pouring a second portion of concrete to complete the step of pouring a first layer of concrete into the casting structure.

13. The method of claim 6, wherein the steps a) through e) are performed sequentially in the order listed.

14. The method of claim 7, wherein the fiber reinforced polymer shell has at least one hole.

15. The method of claim 7, wherein the fiber reinforced polymer shell is a sleeve encompassing the bars.

16. The method of claim 6, wherein the at least one fiber reinforced polymer cage includes a plurality of shells attached to at least two common bars.

17. The method of claim 6, wherein a plurality of cages are spaced in parallel in the concrete casting structure.

18. The method of claim 6, further comprising orienting the composite wall panel to receive a load directed parallel with the bars.

* * * * *